(12) United States Patent
Adams et al.

(10) Patent No.: US 7,392,668 B2
(45) Date of Patent: **\*Jul. 1, 2008**

(54) LOW HEAT CAPACITY GAS OXY FIRED BURNER

(75) Inventors: Harry P. Adams, Granville, OH (US);
David J. Baker, Newark, OH (US);
Christopher Q. Jian, Westerville, OH (US); William W. Toth, Newark, OH (US)

(73) Assignee: OCV Intellectual Capital LLC DE (US)

( * ) Notice: Subject to any disclaimer, the term of this patent is extended or adjusted under 35 U.S.C. 154(b) by 571 days.

This patent is subject to a terminal disclaimer.

(21) Appl. No.: 10/864,217

(22) Filed: Jun. 9, 2004

(65) Prior Publication Data

US 2006/0179886 A1    Aug. 17, 2006

Related U.S. Application Data

(60) Provisional application No. 60/477,462, filed on Jun. 10, 2003.

(51) Int. Cl.
*C03B 5/16* (2006.01)
(52) U.S. Cl. .............. 65/346; 65/347; 65/335; 65/179; 65/355; 432/247
(58) Field of Classification Search .............. 65/346, 65/347, 179, 355–337, 135, 136; 432/247
See application file for complete search history.

(56) References Cited

U.S. PATENT DOCUMENTS

| 3,525,604 A | 8/1970 | Van Dornick |
| 3,552,949 A | 1/1971 | Boyle |
| 3,592,623 A | 7/1971 | Shepherd |
| 4,046,547 A | 9/1977 | Pieper |
| 4,213,753 A | 7/1980 | Negroni et al. |
| 4,473,388 A * | 9/1984 | Lauwers .................... 65/134.4 |
| 4,481,024 A | 11/1984 | Bly |
| 4,540,361 A | 9/1985 | Gagne |
| 4,604,123 A | 8/1986 | Desprez et al. |
| 4,737,178 A | 4/1988 | Reifschneider et al. |
| 4,944,785 A | 7/1990 | Sorg et al. |

(Continued)

FOREIGN PATENT DOCUMENTS

DE            9206502        10/1992

(Continued)

OTHER PUBLICATIONS

Schnepper et al., "Coupled Combustion Space-Glass Bath Modeling of a Float Glass Melting Tank Using Full Oxy-Combustion," Advances in Fusion and Processing Glass II, Canada, Jul. 1997, pp. 219-224.

(Continued)

*Primary Examiner*—Mark Halpern
(74) *Attorney, Agent, or Firm*—Margaret S. Millikin

(57) ABSTRACT

A front end for a glass forming operation including an open channel and at least one burner. The channel surface has at least one burner port and a burner oriented in the burner port at an acute angle relative to the channel surface. The surface may be a top, side or end wall and the burner port is at an acute angle relative to the surface of the wall.

9 Claims, 4 Drawing Sheets

U.S. PATENT DOCUMENTS

| | | |
|---|---|---|
| 5,116,399 A | 5/1992 | Lauwers |
| 5,139,558 A | 8/1992 | Lauwers |
| 5,169,424 A | 12/1992 | Grinnen et al. |
| 5,417,432 A | 5/1995 | Shamp et al. |
| 5,500,030 A | 3/1996 | Joshi et al. |
| 5,807,418 A | 9/1998 | Chamberland et al. |
| 5,814,121 A | 9/1998 | Travis |
| 5,823,769 A | 10/1998 | Joshi et al. |
| 5,925,165 A | 7/1999 | Pflugl et al. |
| 5,934,899 A | 8/1999 | Joshi et al. |
| 6,079,229 A | 6/2000 | Legiret et al. |
| 6,101,847 A | 8/2000 | Shamp et al. |
| 6,109,062 A | 8/2000 | Richards |
| 6,210,151 B1 | 4/2001 | Joshi et al. |
| 6,233,974 B1 | 5/2001 | Anderson et al. |
| 6,237,369 B1 | 5/2001 | LeBlanc et al. |
| 6,442,041 B2 | 6/2002 | Simpson et al. |
| 6,436,337 B1 | 8/2002 | Gross |
| 6,519,973 B1 | 2/2003 | Hoke et al. |
| 6,705,118 B2 | 3/2004 | Simpson et al. |
| 7,168,269 B2 | 1/2007 | Simpson et al. |
| 2001/0039813 A1* | 11/2001 | Simpson et al. ............ 65/134.4 |
| 2003/0188554 A1 | 10/2003 | Baker et al. |
| 2004/0131988 A1 | 7/2004 | Baker et al. |
| 2007/0119213 A1 | 5/2007 | Simpson et al. |

FOREIGN PATENT DOCUMENTS

| | | |
|---|---|---|
| EP | 0 508 139 | 3/1992 |
| EP | 0 546 238 | 3/1992 |
| EP | 0 789 191 | 8/1997 |
| EP | 0 808 806 | 11/1997 |
| EP | 1 077 201 | 11/2005 |
| GB | 325238 | 2/1930 |
| JP | 05078133 | 3/1993 |
| SU | 1836603 | 8/1993 |
| WO | WO 94/06724 | 3/1992 |
| WO | WO 02/092521 | 11/2002 |
| WO | WO 03/084885 | 10/2003 |

OTHER PUBLICATIONS

Glass Making Today, edited by P.J. Doyle, Portcullis Press, first publication 1979, pp. 119-120.

A Modeling Study Comparing an Air- and Oxy-Fuel Fired Float Glass Melting Tank, International Congress on Glass, San Francisco, Jul. 1998.

* cited by examiner

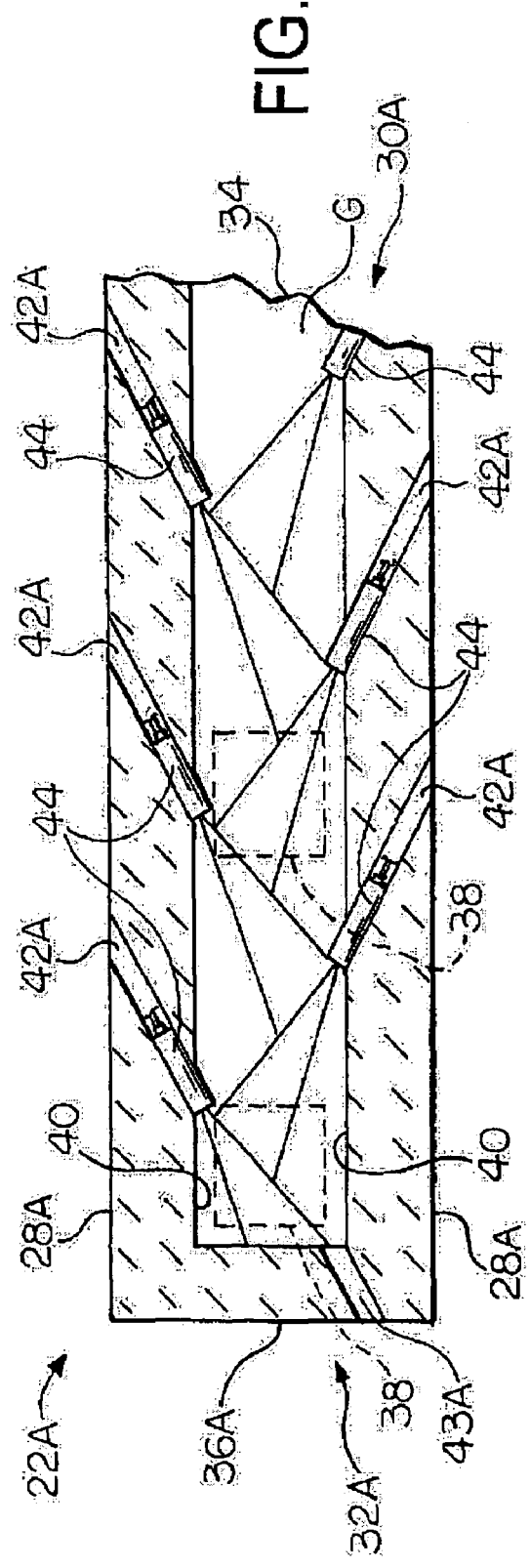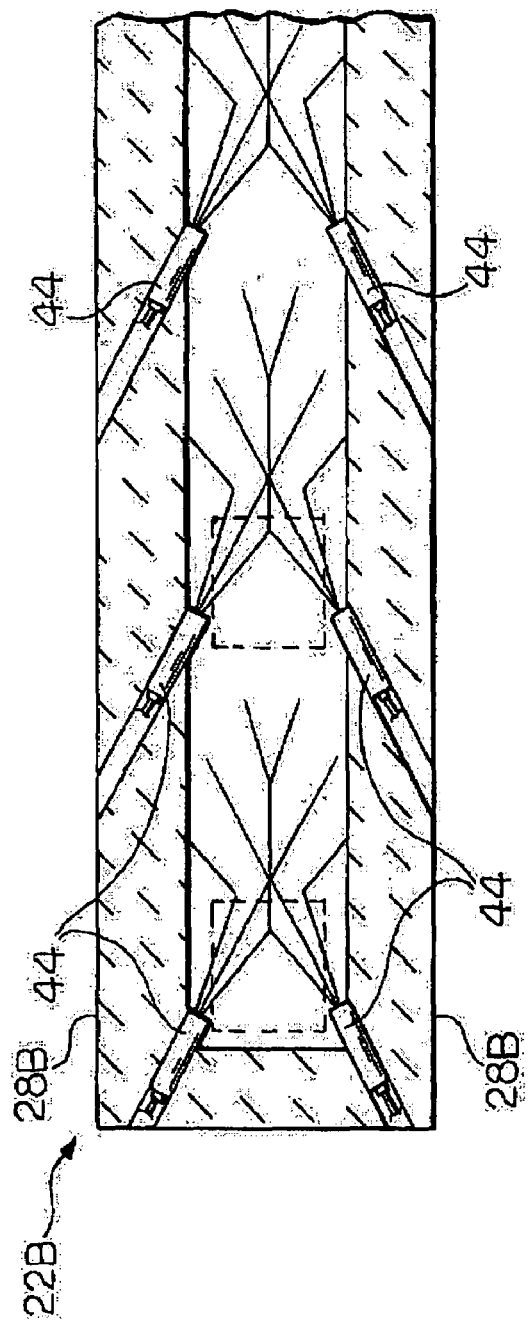

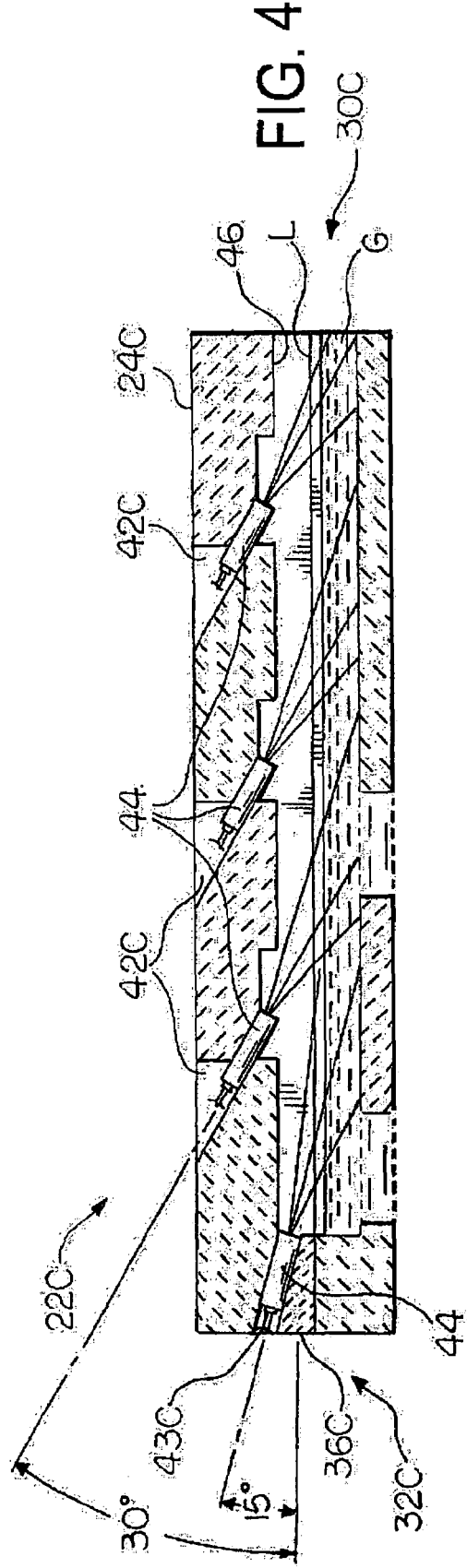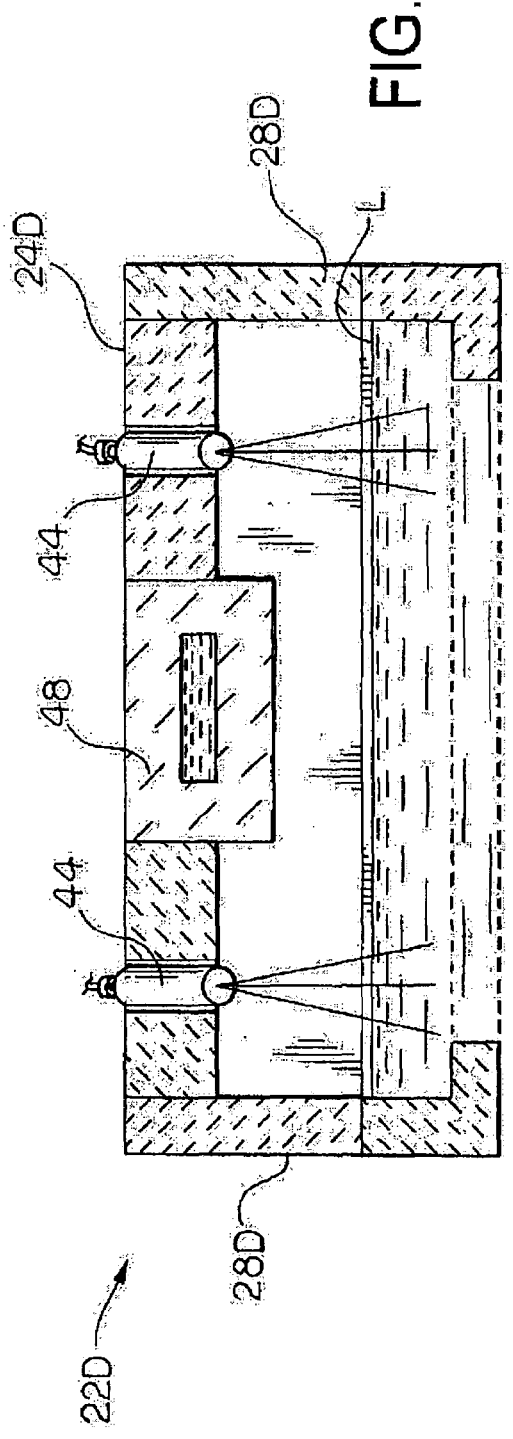

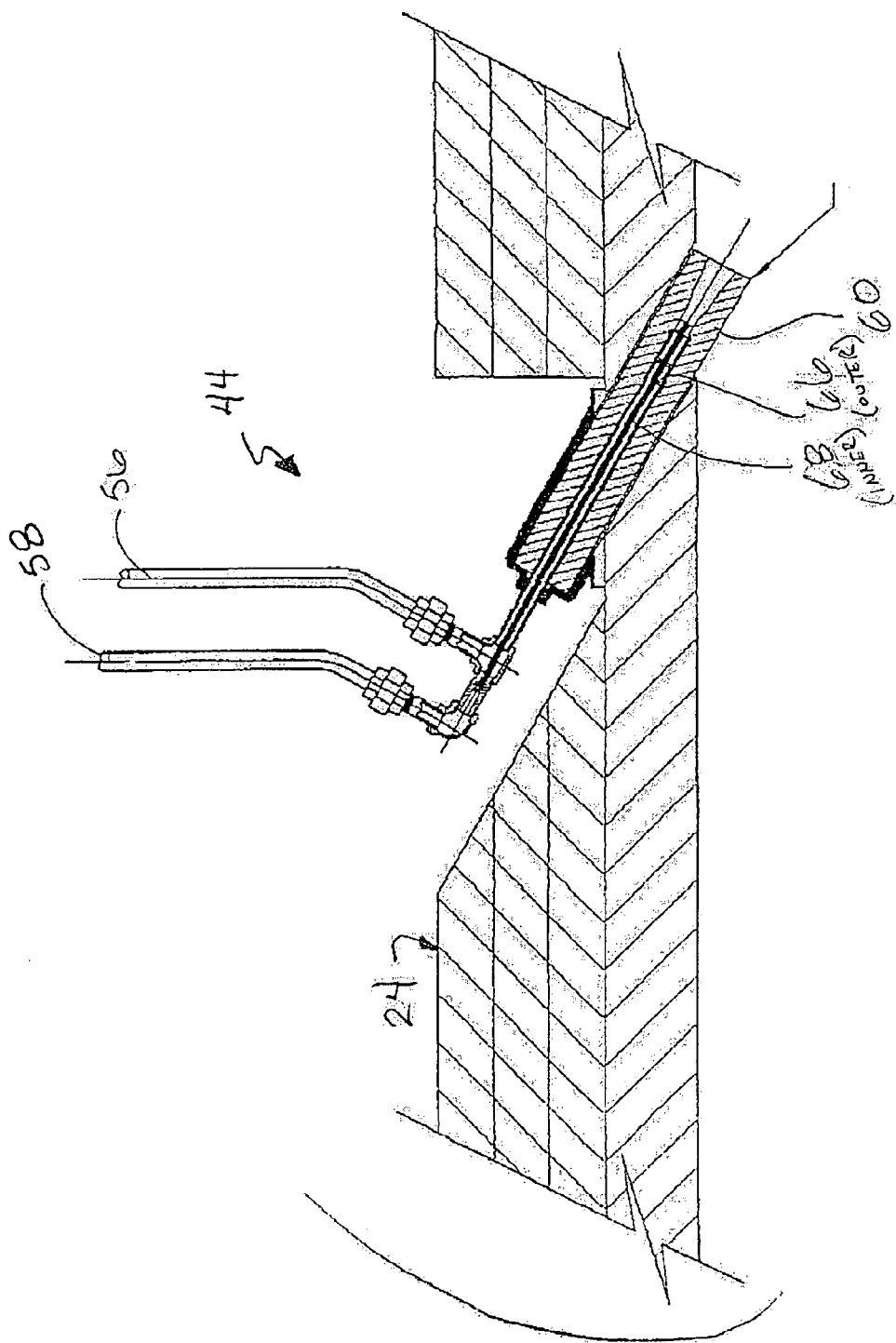

US 7,392,668 B2

LOW HEAT CAPACITY GAS OXY FIRED BURNER

CROSS-REFERENCE TO RELATED APPLICATIONS

This patent application claims the benefit of U.S. Provisional Application 60/477,462 filed on Jun. 10, 2003, which is hereby incorporated by reference in its entirety.

TECHNICAL FIELD AND INDUSTRIAL APPLICABILITY OF THE INVENTION

This invention relates to forming operations in the glass fabrication industry and more particularly to a front end for use in forming operations. Most particularly, this invention relates to an oxygen-fired front end for use in glass forming operations.

BACKGROUND OF THE INVENTION

In the fabrication of glass articles, batch material is reduced to molten glass by passing the batch material through a melting furnace, which is commonly referred to as a melter. The molten glass is delivered downstream from the melter through a system of channels and forehearths. This system of channels and forehearths is referred to as a front end. The front end serves as a conduit to deliver the molten glass to one or more production points. The front end also serves to cool and condition the molten glass prior to reaching the production points. These production points are referred to as forming positions. Each forming position includes a bushing for a fiber forming operation or a gob cutter for a container forming operation. Bushings or gob cutters typically are secured to the forehearths via forehearth steel.

maintain the molten glass G at a desired operational temperature. An example of a conventional forehearth 10 is shown in FIG. 1. The forehearth 10 includes a top or crown (not shown), a bottom (also not shown), and laterally spaced sidewalls 16. Portions of the forehearth 10 above the level of the molten glass G are constructed of super structure refractory. Portions of the forehearth 10 below the level of the molten glass G are constructed of glass contact refractory.

A plurality of burner ports 18 is drilled through the sidewalls 16. The burner ports 18 are drilled through the super structure of the forehearth 10. The burner ports 18 are drilled at a right angle relative to the sidewalls 16. The burner ports 18 are adapted to receive burners 20. The burner ports 18 are spaced about four to five inches from one another. Consequently, a large number of burners, manifolds, pipes, fittings and valves (not shown) are associated with air-gas mixture burners.

In a conventional firing system, a source of air and a source of gas pass through regulators. The air and gas are mixed and then passed through a system of pipes to a plurality of burners, typically 20 to 100 burners. The burners are typically air-gas mixture burners which use the air as an oxidant for the combustion of the gas to provide heat to a zone, commonly referred to as a control zone. The front end typically has between six and sixty control zones, each complete with a gas control safety and pressure reduction system, combustion air blowers, and valves and regulators capable of controlling the temperature of the molten glass G between the melter and the forming position.

An air-gas mixture firing system is not only costly to construct, it is inefficient to operate. An air-gas mixture firing system uses 30 to 75 cubic feet per hour of gas to heat a one-foot section of channel with an air-gas mixture. It requires about 10 cubic feet of air for combustion of 1 cubic foot of natural gas. The air must be heated from an ambient temperature to the temperature of the exhaust gas stream. About 70 to 85 percent of the energy heats the air to the exhaust gas temperature, leaving 15 to 30 percent of the energy as heat available for the glass forming operation. Thus, an air-gas mixture firing system has minimum efficiency of combustion.

In addition to having a minimum efficiency of combustion, an air-gas mixture firing system is an inefficient means to heat the molten glass G. The flame temperature of an air-gas mixture burner in the air-gas mixture firing system reaches about 3500° F. However, the optical properties of the molten glass G and products of combustion limit the amount of radiant energy that penetrates the molten glass G. This causes the vertical temperature gradient of the molten glass G to be high. With air-gas burners it is difficult to control the temperature distribution in the glass by controlling the profile of the burners.

What is needed is a front end that reduces fuel consumption by using a low-cost system for firing forehearths with a combination of gas and oxygen.

SUMMARY OF THE INVENTION

The present invention is directed toward a front end for a glass forming operation. The front end comprises an open ended channel and at least one burner. The channel has at least one surface. The surface has at least one burner port therein. The burner is oriented in the burner port at an acute angle relative to the surface.

The present invention is also directed toward a front end comprising a channel having a top and a pair of sidewalls each having a surface. At least one burner port is in at least one of the surfaces. The burner port is at an acute angle relative to at least one surface. The burner is an oxygen-fired burner.

The present invention is further directed toward a front end comprising a channel having a top and sidewalls each having a super structure surface constructed of refractory material. The channel has an upstream end and a downstream end. At least one of the surfaces has a plurality of burner ports therein. The burner ports extend at an acute angle relative to at least one surface and in a plane extending between the upstream end and the downstream end and perpendicular to at least one surface. Oxygen-fired burners extend axially through corresponding burner ports.

Various objects and advantages of this invention will become apparent to those skilled in the art from the following detailed description of the preferred embodiment, when read in light of the accompanying drawings.

BRIEF DESCRIPTION OF THE DRAWING

FIG. 2 is a cross-sectional top plan view in cross-section of a channel according to one embodiment of the invention, wherein burners are alternatively spaced in the sidewalls of the channel.

FIG. 3 is a cross-sectional top plan view in cross-section of a channel according to another embodiment of the invention, wherein burners are spaced in pairs in the sidewalls of the channel.

FIG. 4 is a side elevational view in cross-section of a channel according to another embodiment of the invention, wherein burners sweep the top of the channel.

FIG. 5 is a front elevational view in cross-section of a multi-zone channel according to yet another embodiment of the invention.

FIG. 6 is a cross sectional plan view of a gas-oxygen burner useful with the present invention.

DETAILED DESCRIPTION AND PREFERRED EMBODIMENTS OF THE INVENTION

Figure 1:
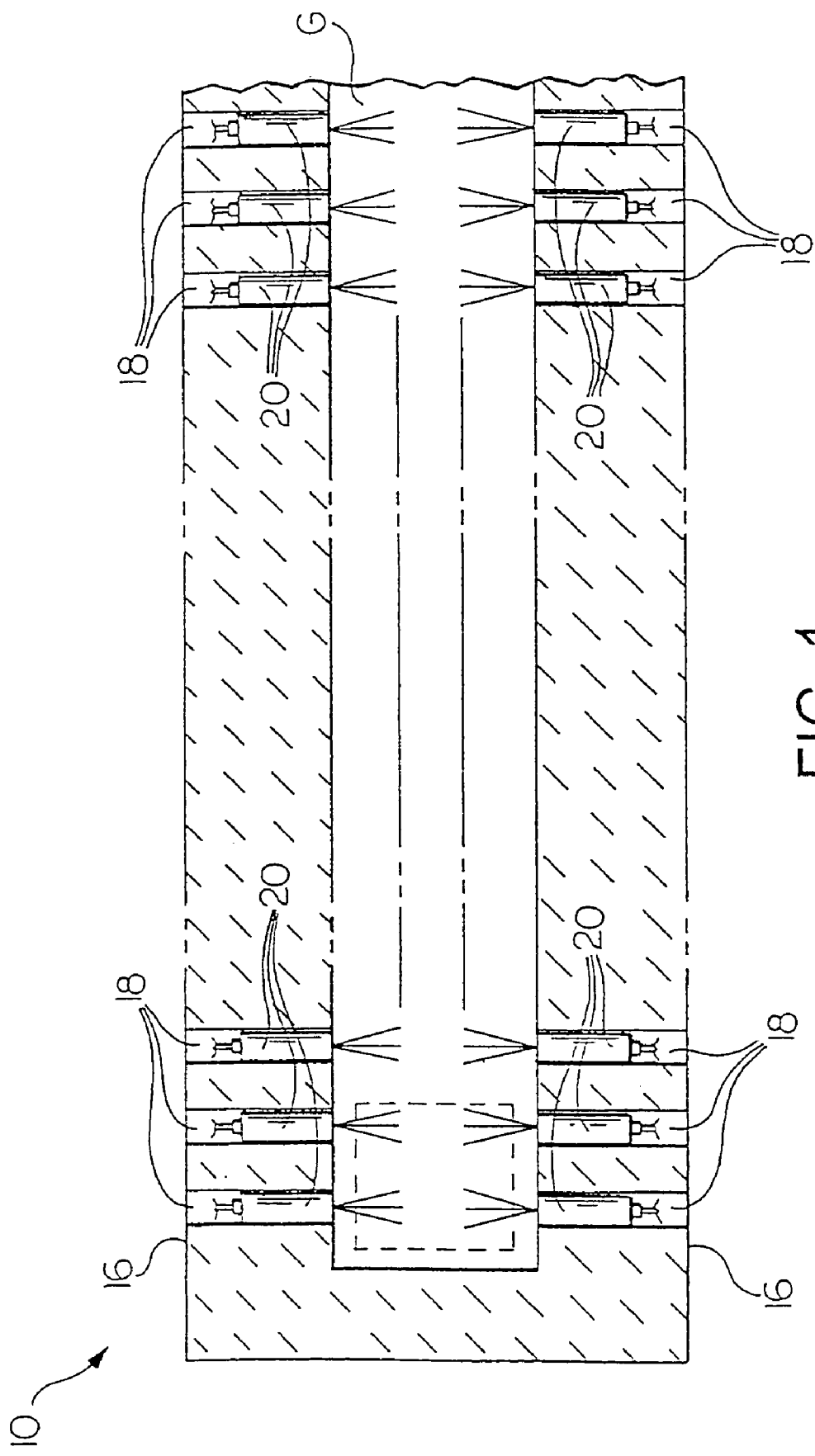
FIG. 1 is a cross-sectional top plan view of a channel of a prior art front end.

To overcome the deficiencies of an air-gas mixture firing system, concentric-type oxygen-gas mixture burners have been developed. A typical oxygen-gas firing system is supplied by BH-F) (ENGINEERING) LTD. of England. The system uses burners commonly referred to as oxygen-gas burners. Oxygen-gas burners 44 use oxygen (e.g., typically 90 to 99 percent purity with an impurity being a combination of nitrogen and argon) in a high purity as an oxidant and fossil fuel for a combustible hydrocarbon supply. The oxygen-gas burner 44 ignites the mixture of oxygen and gas at the point of ignition or combustion. The oxygen-gas burners are placed 4-5 inches apart, similar to the spacing to the air-gas mixture burners described above. To date gas-oxygen burners 44 have been used in glass melters but have not been used in the channel or front end of a glass The oxygen-gas burners 44 reduce CO2 and NO2 emissions, making these burners more environmentally friendly and possibly reducing greenhouse gas taxes. Oxygen-gas burners 44 fire more efficiently by reducing the waste gas stream and providing more available heat for use in the glass forming operation. This is because an oxygen-gas burner requires less volume (i.e., 2 cubic feet of oxygen) for combustion of 1 cubic foot of natural gas. Consequently, exhaust gases (i.e., the stream of gas used to heat the oxygen-gas mixture) are reduced by about 73 percent. As a result, about 65 percent of the energy in an oxygen-gas mixture firing system is used to transfer available heat to the glass rather than heating inert gasses such as nitrogen.

In addition to having a greater efficiency of combustion, an oxygen-gas mixture firing system is a more efficient means to heat the molten glass. The flame temperature of an oxygen-gas burner 44 is about 4500° F. to 4800° F. (2500° C.-2650° C.). At this temperature, the flame and products of combustion radiate energy at wavelengths that the molten glass can absorb. This provides uniform glass temperature horizontally on the surface of the molten glass and vertically through the molten glass.

Referring now to the drawings, there is illustrated in FIG. 2 a front end of a glass forming operation. The front end comprises an open channel and a forehearth downstream of the open channel. To simplify the description, the channel and forehearth will be cooperatively described as a channel 22. The channel 22 delivers molten glass G from a melter (not shown) to a forming position (not shown).

Molten glass G does not contact an upper portion of the channel 22 above the molten glass level L shown in FIG. 4 and FIG. 5. Because the super structure refractory material used for the upper portion are not required to withstand corrosive effects of molten glass G, the upper portion can be constructed from relatively inexpensive super structure refractory material, such as silica, mullite, or other suitable materials.

The portion of the channel 22, below the glass level L comes into contact with the molten glass G and is constructed of a more costly glass contact refractory material. A ceramic refractory material such as zircon, chromic oxide, or other suitable material is used as the glass contact refractory material.

The channel 22 may comprise a top or crown 24 a bottom 50, and sidewalls 28. The channel 22 has an upstream end, generally indicated at 32, and a downstream end, generally indicated at 30. An open end 34 may be provided at the downstream end 30 of the channel 22. An end wall 36 may be provided at the upstream end 32 of the channel 22. One or more glass orifices 38 may be provided in the bottom of the channel 22 proximate, adjacent or close to the end wall 36. The forehearth of the front end is that portion of the channel 22 having the end wall 36 and the glass orifices 38 in the bottom.

The sidewalls 28 each define a surface 40. The surfaces 40 have at least one burner port 42 therein. The burner port 42 may be drilled in the super structure refractory material of existing front ends with a refractory core drill. New front ends may be constructed with built-in burner blocks having burner ports 42 formed therein (see FIG. 4). A burner 44 is provided in the burner port 42. In a preferred embodiment of the invention, a plurality of burner ports 42 is provided and a burner 44 is provided in each of the burner ports 42. The burners 44 are preferably oxygen-fired burners, wherein oxygen (in high purity) and gas are mixed at a point of ignition or combustion. That is to say, the burners use oxygen as an oxidant and fossil fuel for a combustible hydrocarbon supply. Such burners are well known to those of ordinary skill in the art of the invention.

The burners 44 are positioned above the glass level L (shown in FIGS. 4 and 5). The burners 44 are oriented in a plane (e.g., a substantially horizontal plane) perpendicular to the surfaces 40 and at an acute angle relative to the surfaces 40. The burners 44 are pointed toward the downstream end 32 of the channel 22 at an angle between about 5 degrees to about 85 degrees relative to the surfaces 40, as shown in FIG. 2. Alternatively, the burners 44 can be pointed toward the upstream end 30 of the channel 22 at an angle between about 95 degrees to about 175 degrees relative to the surfaces 40, as shown in FIGS. 3 and 4.

With reference to FIG. 2, the burners 44 may be staggered or alternatively spaced so that burners 44 in opposing sidewalls 28 are laterally or vertically offset or do not align with one another. The flame temperature of an oxygen-fired burner is about 4200° F.-5200° F. (2300° C.-2900° C.). The flame is controlled by gas and oxygen flow so that the flame does not directly contact the sidewalls 28. Although the flame does not directly contact the sidewalls 28, the sidewalls 28 are heated by convection or radiation from the flame. This radiant heat is sufficient to properly condition the molten glass G and maintain the molten glass G at a desired temperature without compromising the integrity of the channel 22 by exposing the channel 22 to excessively high temperatures. Using the forehearth of the present invention, burners 44 may be spaced between about 1 foot to about 5 feet apart and provide sufficient heat to the glass.

A burner port 43 may be provided in the end wall 36 to be used as an exhaust burner port or to support another burner 44 to provide additional heat to condition or to maintain the molten glass G at a desired temperature.

Another embodiment of the invention is shown in FIG. 3. In FIG. 3, the burners 44 are provided in pairs. In this embodiment of the invention, opposing burners 44 are typically not staggered or alternatively spaced. The opposing burners 44 may be laterally or vertically aligned to provide more uniform distribution of heat may be provided.

In the present invention, the burners 44 may be oriented so that the flames of opposing burners 44 cause one another to reflect toward the sidewalls 28 of the channel 22. It is also possible to angle the burners 44 downward at an angle in a range from about 0 degrees to about 20 degrees.

As shown in FIG. 4, channel 22 may have a surface 46 defined by the top 24 of the channel 22. This surface 46 has at least one burner port 42 therein. A burner 44 is provided in the burner port 42. In a preferred embodiment of the invention, a plurality of burner ports 42 is provided and a burner 44 is provided in each of the burner ports 42. The burners 44 are preferably oxygen-fired burners.

The burners 44 may be oriented in a plane (e.g., a substantially vertical plane) perpendicular to the surface 46 and at an acute angle relative to the surface 46. In one embodiment of the present invention, the burners 44 are pointed toward the upstream end 30 of the channel 22 at an angle between about 5 degrees to about 85 degrees relative to the surface 46, as shown in FIGS. 3 and 4. Alternatively, the burners 44 may be pointed toward the downstream end 32 of the channel 22 at an angle between about 95 degrees to about 175 degrees relative to the surface 46, similar to the burners 44 shown in FIG. 2.

As shown in the drawings, a hole 43 may be provided in the end wall 36 of the channel 22. The hole 43 may be used as an exhaust vent for the channel 22. In another embodiment of the invention, hole 43 may be a burner port used to support another burner 44. Although, burner 44 in burner port 43 in the end wall 36 may be oriented at an angle A of about 15 degrees relative the top surface 46, as shown in FIG. 4, other angles may be suitable for carrying out the invention. For example, if burner port 43 is in end wall 36, then burner 44 be at any angle B ranging from about 5 degrees to about 90 degrees (or horizontal) relative to the end wall 36. When burner port 43 is in the junction of the end wall 36 and the top surface 46, the burner 44 can be at any angle B ranging from about 5 degrees to about 85 degrees relative to the end wall 36.

Yet another embodiment of the invention is shown in FIG. 5. The channel 22 according to this embodiment of the invention is a hybrid channel having an intermediate cooling channel 48 and diametrically disposed burners 44. Although the burners 44 shown are provided in the top 24 of the channel 22, the burners 44 may be provided in the sidewalls 28. This embodiment of the invention is useful in wider firing zones where some cooling is desired, such as in glass container forming operations. Such operations typically are used channels that measure at least 5 feet (1.5 m) wide.

As shown in FIG. 6 a burner design which may be used in the present invention is a tube in tube type burner. Oxygen supply stream 56 is fed into tube 66. Natural gas supply stream 58 is fed into burner tube 68 at the center of oxygen supply tube 66. Tubes 66 and 68 may be concentric tubes where the inner natural gas supply tube 68 extends beyond the distal end of outer oxygen supply tube 66. Burner block 60 may be formed of any high temperature refractory such as mullite. Burner block 60 has a central bore to receive the natural gas supply tube 68 and oxygen supply tube 66 and may contain a conical outlet portion to allow for the expansion of the combustion gasses. A preferred burner block allows for low flow of combustion gasses and allows for insertion of the burner 44 in the top of the channel. The tube in tube design provides for controlled mixing of the oxygen and gas to prevent high temperatures at the nozzle and in the burner block. The fuel flow ranges from 25,000 to 150,000 btu ($2.6 \times 10^6$-$1.6 \times 10^7$ J).

The fuel tube 68 is positioned to prevent immediate mixing of the fuel and oxygen. The burner 44 delivers a small high temperature flame along a channel.

In each of the foregoing embodiments of the invention, the burners 44 may be oriented so that the burner flame is not pushed into the top 24 or the sidewalls 28. Moreover, the burners 44 should also be separated and the flame tempered so that excessive levels of heat are not reached within the channel 22. This avoids the risk of overheating the top 24 the sidewalls, and/or the burner nozzle, resulting in damage to the refractory material or burners 44. As can be clearly seen in FIGS. 2, 3 and 4. the oxygen-fired burners 44 are oriented to direct flame and products of combustion in the direction of the length of the channel 22.

In each of the foregoing embodiments of the invention, the burners 44 may be formed of a high temperature a nickel-chromium-molybdenum-niobium alloy such as INCONEL alloys are available from Special Metals Corporation of New Hartford, N.Y. Suitable INCONEL alloys include 600, 601, 617, 625, 625 LCF, 706, 718, 718 725, 725 HS, SPF, X-750, MA754, 783, 792, and HX nickel chromium alloys. The nickel-chromium-molybdenum-niobium alloys have good resistance to oxidation, reducing environments, corrosive environments, high temperature environments, relaxation resistance and mechanical properties. Other suitable burner materials include high temperature stainless steel such as RA410, RA410S, RA17-4, RA304, RA316, RA321, RA347, RAM303, RA304, and RA316 available from Rolled Alloys of Temperance, Mich.

In each of the foregoing embodiments of the invention, the flow of oxygen is preferably about 20 to 200 cubic feet per hour for each burner 44. Any gas that requires this amount of flow for complete combustion may be suitable for carrying out the invention. The oxygen demand is typically independent of the gas used.

The front end of the invention is advantageous because it uses fewer burners, fewer valves, fewer fittings, and a smaller number of associated manifolds and pipes. Firing is more efficient, therefore less fuel is consumed. Consequently, fuel pipe sizes are reduced. There is also a large reduction of pipe sizes for piping oxygen as opposed to air Installation costs are also reduced.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

The invention of this application has been described above both generically and with regard to specific embodiments. Although the invention has been set forth in what is believed to be the preferred embodiments, a wide variety of alternatives known to those of skill in the art can be selected within the generic disclosure. The invention is not otherwise limited, except for the recitation of the claims set forth below.

We claim:

1. A front end for a glass forming operation, the front end comprising:

a channel having top and side walls, each side wall having upper portions constructed from a super structure refractory material and lower portions of said front end constructed from a contact refractory material, said super structure refractory material having a higher resistance to corrosion than said contact refractory material;

said channel having an upstream end, a downstream end, at least one of said surfaces having one or more oxygen-fired burner ports therein; and one or more oxygen-fired burners angled so that the burner flame is does not directly contact the sidewalls, each oxygen-fired burner arranged to supply heat to molten glass in the channel to maintain molten glass at a desired operational temperature, the oxygen-fired burners being structured to substantially function without a source of air, the oxygen-fired burners extending through a burner port so that said oxygen-fired burners extend at an acute angle relative to at least one surface and in a plane extending between said upstream end and said downstream end and perpendicular to said least one surface, the oxygen-fired burners being disposed to direct the flame and products of combustion at a downward acute angle relative to the top wall, and to direct the flame and products of combustion along the length of the channel, the angle being such that the flame does not directly contact the sidewalls.

2. The front end of claim 1, wherein said channel further includes an end wall and a bottom, said end wall having upper portions constructed from super structure surface refractory material and lower portions of said front end constructed from a contact refractory material, and at least one oxygen-fired burner port in said end wall, said bottom of said channel having at least one glass orifice therein proximate said end wall.

3. The front end of claim 2, wherein at least one of said oxygen-fired burner ports are in said top of said channel.

4. The front end of claim 3, wherein one of said oxygen-fired burners is in said at least one oxygen-fired burner port in said end wall, said oxygen-fired burners being directed toward said upstream end of said channel.

5. The front end of claim 4, wherein said at least one oxygen-fired burner in said at least one oxygen-fired burner port in said end wall is at an angle in a range of about 5 degrees to about 90 degrees relative to said end wall.

6. The front end of claim 1, wherein one or more of said burner ports are in said surface of said sidewalls of said channel.

7. The front end of claim 6, wherein said oxygen-fired burner ports are in one of said side walls that do not laterally align with said oxygen-fired burner ports in the other one of said side walls.

8. The front end of claim 6, wherein said oxygen-fired burner ports are in one of said side walls laterally aligning with said oxygen-fired burner polls in the other one of said side walls.

9. The front end of claim 1, wherein said oxygen-fired burner ports are spaced about 1 foot to about 5 feet apart.

* * * * *